United States Patent [19]

Fujioka et al.

[11] Patent Number: 4,527,867
[45] Date of Patent: Jul. 9, 1985

[54] WIDE ANGLE ZOOM LENS

[75] Inventors: Yoshisato Fujioka, Higashikurume; Atsushi Kawamura, Yokosuka, both of Japan

[73] Assignee: Ricoh Company, Ltd., Tokyo, Japan

[21] Appl. No.: 488,581

[22] Filed: Apr. 25, 1983

[30] Foreign Application Priority Data

Jun. 14, 1982 [JP] Japan .................. 57-100656

[51] Int. Cl.³ .................. G02B 15/14; G02B 9/60
[52] U.S. Cl. .................. 350/427
[58] Field of Search .......... 350/427, 423, 426, 462, 350/465, 454, 455, 458

[56] References Cited

FOREIGN PATENT DOCUMENTS 55-14403  9/1980  Japan .

Primary Examiner—John K. Corbin
Assistant Examiner—Paul M. Dzierzynski
Attorney, Agent, or Firm—Oblon, Fisher, Spivak, McClelland & Maier

[57] ABSTRACT

A wide angle zoom lens contains, in order from an object side, a first group having a negative focal length, a second group having a positive focal length and a third group having a negative focal length as well as a fourth and a fifth group each of which have a positive focal length. When the lens is moved to effect zooming from the side having a short focal length to a side having a long focal length either the first group is first moved toward the final image plane on an optical axis in a first movement phase and then moved toward the object in a second phase of movement or the first group is moved toward the image with each of the movements being executed in a non-linear fashion to correct variation of a focal length. The second group is monotonically moved towards the object to effect magnetization while the third group remains immovable and the fourth group is monotonically moved toward the object at a rate relatively slower than the second group to effect magnetization while the fifth group also remains immoble.

2 Claims, 17 Drawing Figures

(A)
SPHERICAL ABERRATION SINE CONDITION — F/4, SC, SA

ASTIGMATISM — 38.45°, ΔM, ΔS

DISTORTION — 38.45°

SPHERICAL ABERRATION SINE CONDITION

ASTIGMATISM

DISTORTION

SPHERICAL ABERRATION SINE CONDITION — F/3.44, SC, SA, -0.5 0 0.5

ASTIGMATISM — 38.78°, ΔM, ΔS, -0.5 0 0.5

DISTORTION — 38.78°, -5 0 5 %

WIDE ANGLE ZOOM LENS

BACKGROUND OF THE INVENTION

1. Field of the Invention

This invention relates to a zoom lens for use with size of 35 mm, wherein a wide angle with an angle of field of 78° is included in a magnification region therefor and which has a high magnification in which a zoom ratio is about 3.5 times.

2. Description of the Prior Art

In the past, as a zoom lens in which a wide angle is included in a magnification region therefor, a zoom lens for use with 35 mm size with an angle of field in the range of from 63° to 34° is known which comprises two groups of lenses. In the zoom lens of the type described, in order to secure aperture efficiency of the angle of field in the periphery without increasing an effective diameter of a lens of a first surface and when the first group of lenses are drawn out for focusing in order to prevent relative illumination even when focusing was made at close quarters, it is advantageous to provide an arrangement wherein a negative focal length is applied to the first group on the object side to make small an angle formed between the peripheral flux emitted from the first group and an optical axis. It is apparent however that so far as an image forming system is present in the case where the whole system is taken into consideration, a strong positive refractive power is required for the succeeding second group. Additionally, in order for the light flux which is subjected to emitting action of the first group in order to have a greater width, is incident upon the second group, a high degree of spherical aberration and coma aberration occurs on the side of a long focal length and it is difficult to restrain variation of aberrations over the entire zoom region. Therefore, the zoom ratio is in principal increased to a factor of two.

Recently, a zoom lens having more than three groups of lenses and having a high magnification with a wide angle included in a magnification region has been utilized. However, the leading zoom lens is of the semi-wide angle type in which the angle of field at the end of the short focal length is in the vicinity of 63°. That is, the focal length is in the vicinity of 35 mm in case of 35 mm size. For a zoom lens in which the end of the short focal length is in the vicinity of 28 mm of the focal length and the zoom ratio is close to three times, Japanese Patent Publication No. 55-14403 disclosed a system in which a negative focal length is arranged in the first group. However, in this system, the overall length of the lens cannot be made short at the end of the short focal length and the slope of a cam curve is varied pronounced on the side of the short focal length, thereby adversely effecting operability in that portion. If the focal length of the first group is made small, it is advantageous to provide miniaturization and high magnification ratio, overcoming the aforesaid difficulties, whereas it is extremely difficult to correct aberrations, failing to provide high performance. A limit of the zoom ratio was up to three times by the reciprocal nature.

SUMMARY OF THE INVENTION

In accordance with the present invention, a method for arrangement of and a method for movement of groups of zooms in which negative, positive, negative, positive and positive lenses are arranged in order from the object side which have not heretofore been found are combined thereby to overcome those disadvantages noted above, and to provide an angle field of 78° at the end of a short focal length, to provide a magnification of a zoom ratio which is about 3.5, to provide compactness over the entire zoom region and to correct aberrations in a satisfactory manner.

DETAILED DESCRIPTION OF THE PREFERRED EMBODIMENTS

In the following, a structure of and a method for movement of lens groups of a zoom lens in accordance with this invention will be described with reference to the drawings.

Figure 1:
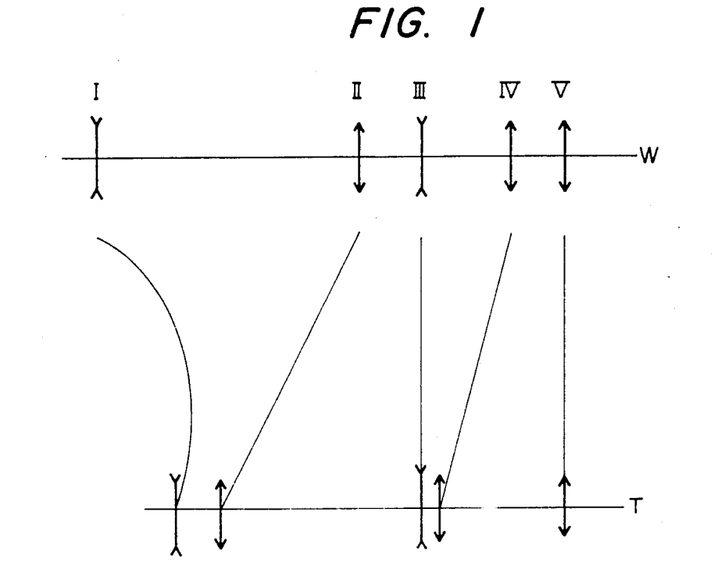
FIG. 1 is an explanatory view showing a basic contruction of and a moving route of a lens system.
Figure 2:
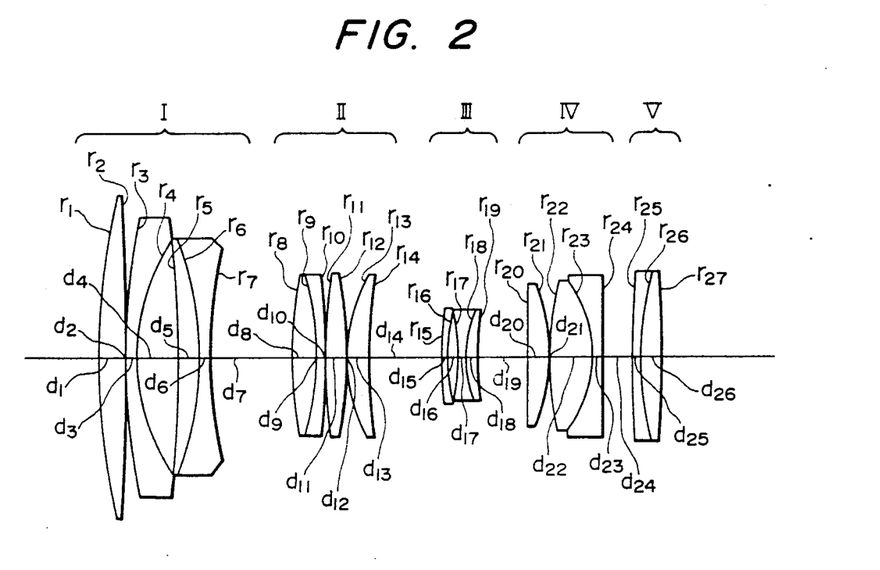
FIGS. 2 to 5 are respectively sectional views showing an arrangement of lenses in an intermediate focal length in embodiments 1 to 4.
Figure 3:
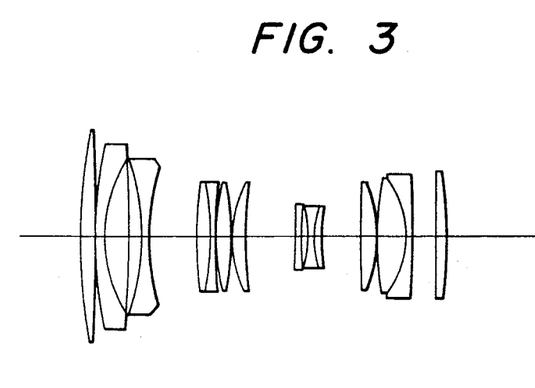
Figure 4:
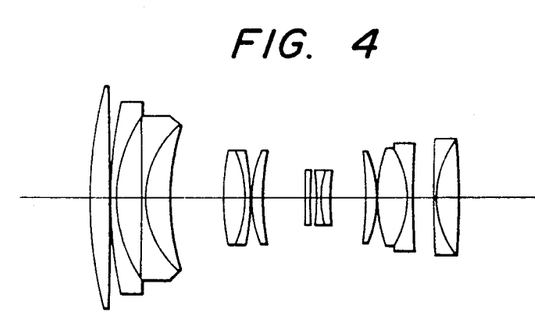
Figure 5:
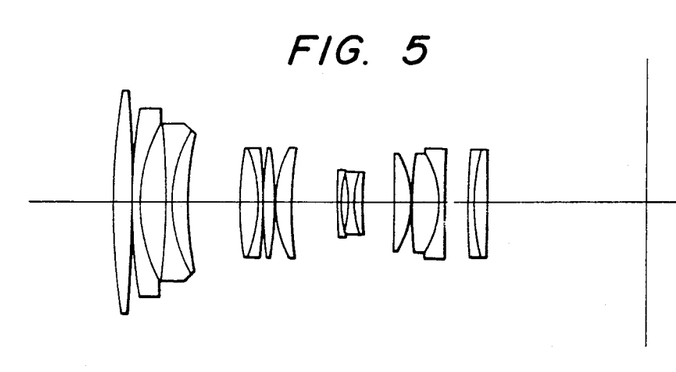
Figure 6:
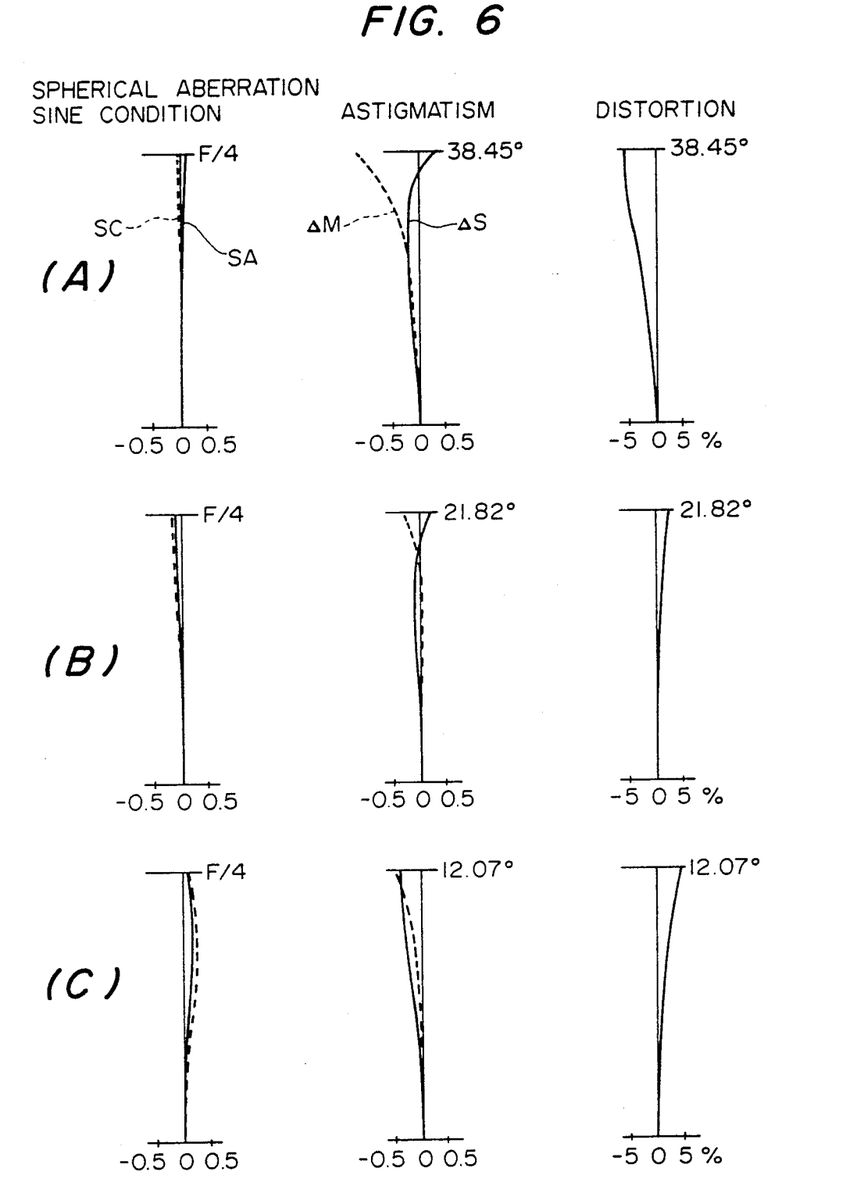
FIGS. 6 to 9 respectively show aberrations of the embodiments.
Figure 7:
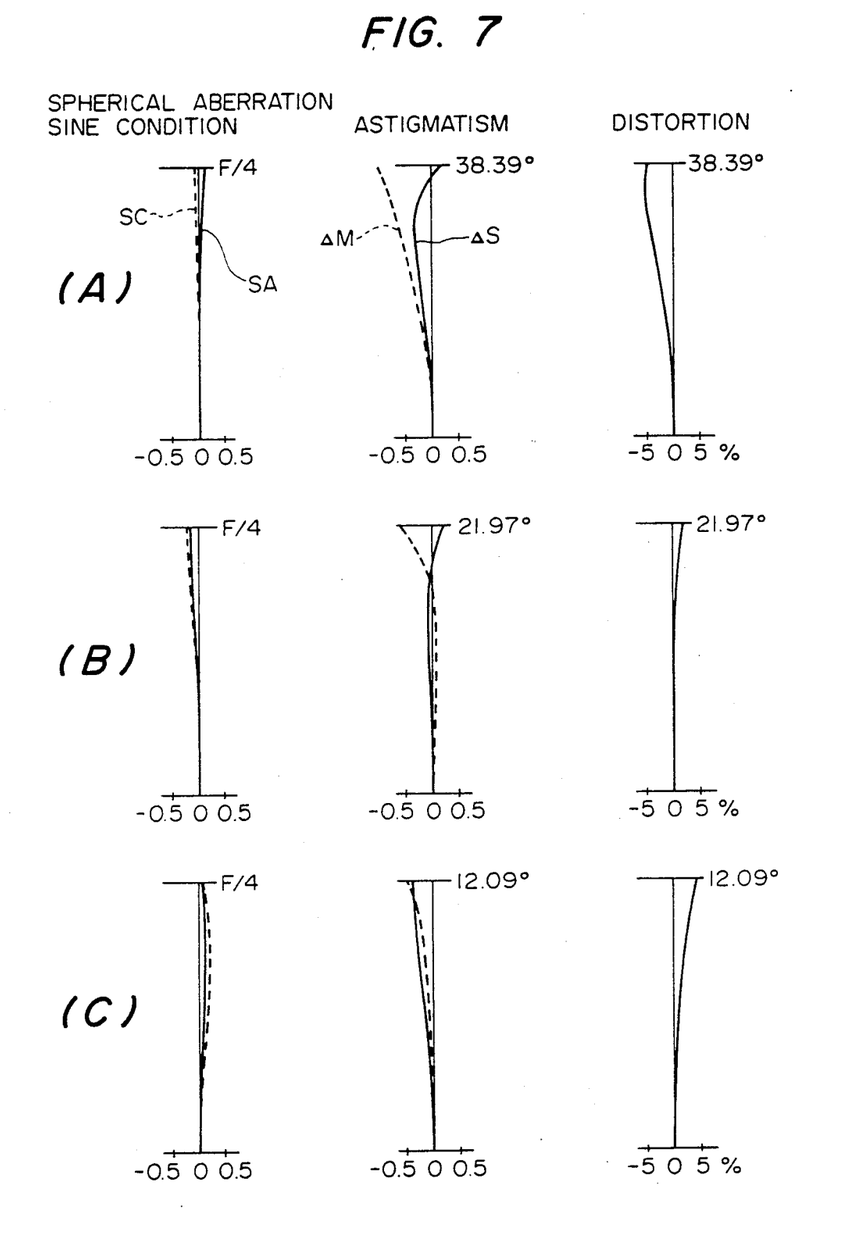
Figure 8:
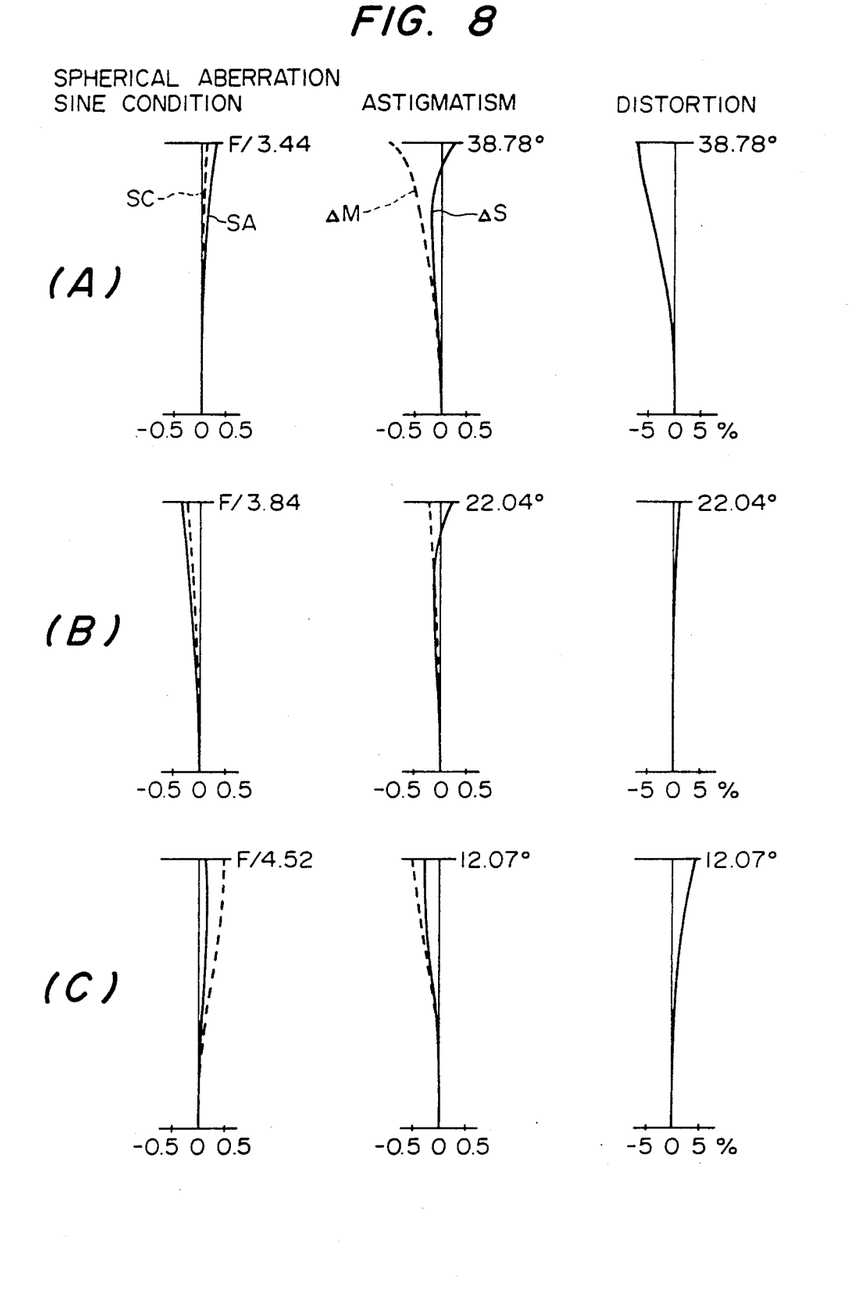
Figure 9:
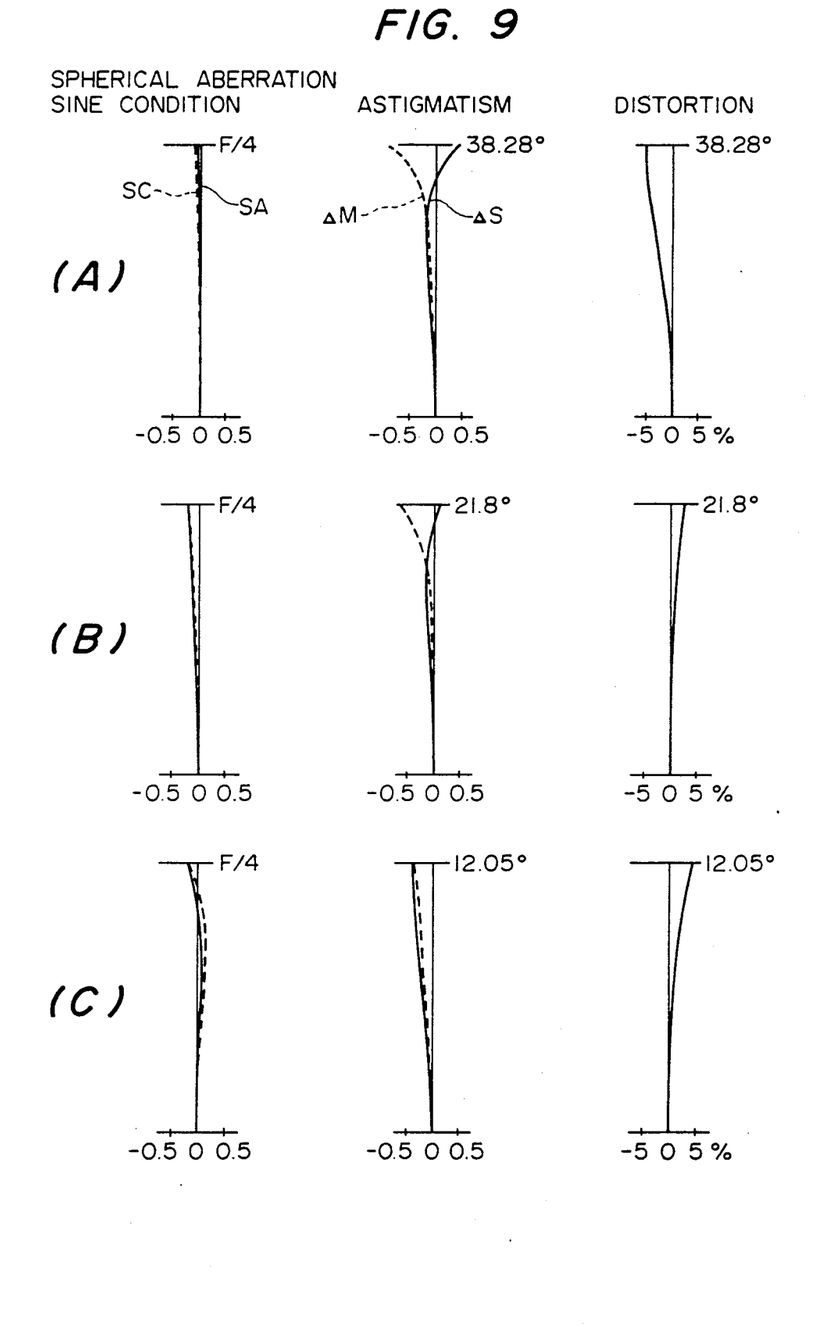

As a basic structure of a zoom lens and a moving route of each group of lenses are shown in FIG. 1, a zoom lens of the present invention comprises, in order from an object side, a first group having a negative focal length, a second group having a positive focal length, a third group having a negative focal length, and a fourth and fifth group both of which have a positive focal length, wherein when zooming is effected from a side of a short focal length to a side of a long focal length, either the first group is firset moved towards the final image plane on an optical axis in a first phase and then moved towards the object in a second phase or the first group is moved towards the image in a non-linear fashion to correct variation of a focal position, said second group is monotonously moved towards the object to effect magnification, said third group remains immovable, said fourth group is monotonously moved towards the object at a rate relatively slower than said second group to effect magnification, and said fifth group remains immovable.

In the zoom lens of this type, inclination of light becomes excessively great between the third group and the fourth group at the end of the short focal length, the peripheral light passes by the peripheral edge of the fourth and fifth groups to rapidly change the characteristic based on an angle of field of an image plane, and astigmatism increases, coma aberration occurs and a diameter of a rear lens increases. Also, inclination of light in the peripheral edge is great between the first and second groups at the end of the short focal length similarly to the former. If said spacing is made great, an increase in a diameter of a front lens immediately results and if the diameter of the front lens is restrained, it becomes impossible to obtain a sufficient relative illumination. Accordingly, in determining the focal length of each group and the moving system, it is necessary to select conditions so as to reduce a spacing between the first and second groups and between the third and fourth groups on the side of the short focal length.

More specifically, the following conditions are desireably met.

$$1.4 < |F_1|/F_w < 1.8 \tag{1}$$

-continued $$0.9 < F_2/F_w < 1.4 \quad (2)$$

$$1.1 < F_4/F_w < 2 \quad (3)$$

$$4 < F_5/F_w < 20 \quad (4)$$

$$0.3 < V_4/V_2 < 1 \quad (5)$$

$$\left. \begin{array}{c} \sum\limits_{j=1}^{k4} \dfrac{1}{f_{4j} \cdot \nu^{4j}} < 0 \\ \sum\limits_{j=1}^{k5} \dfrac{1}{f_{5j} \cdot \nu^{5j}} > 0 \end{array} \right\} \quad (6)$$

where $F_i$: focal length of the i group $F_w$: resultant focal length of the entire system at the end of the short focal length $V_i$: moving speed of zooming of the i group $f_{ij}$: focal length of the j lens which constitutes the i group $\nu_{ij}$: Abbe number of the j lens which constitutes the i group $k_i$: number of lenses which constitute the i group The condition (1) is necessary to provide consistency of compactness and high performance in the entire zoom region and is the condition which greatly influences also on a lens barrel mechanism. If exceeding the lower limit, negative distortion aberration at the side of the short focal length is great and spherical aberration and coma aberration are excessively great at the side of the long focal length. This is because of the fact that the emitting action of the first group is excessively strong to impose a greater burden on the second group. Conversely, when exceeding the upper limit, correction of the aforesaid aberrations becomes easy but the amount of movement by zooming of the first group increases and a slope of a cam curve for movement of the first group on the side of the short focal length become sharp, which results in the worsening of the operability such that a great operating force is required to effect zooming at said portion. In addition, the amount of drawing out the first group for phototaking at close quarters increases to decrease an effect by which the angle formed between the light flux which is emitted from the first group to form a peripheral image and the optical axis, resulting in an increase in diameter of the front lens or in a difficulty to secure the relative illumination.

The condition (2) is necessary to control variation of aberrations in zooming. When exceeding the lower limit, the positive refractive force of the second group is too strong, and particularly, the spherical aberration at the region of the intermediate focal length is short in correction and unsymmetrical coma aberration results from the intermediate focal length towards the long focal length. When exceeding the upper limit, the action as a variator of the second group is weakened to increase the amount of movement required for zooming and make the lens system large.

The condition (3) is necessary to correct the overall length of the lens and various aberrations, particularly, distortion aberration. The condition (3) is complementary to the condition (4) and is provided whereby the refractive force is adequately distributed to maintain the aberration in a good manner without forming the lens system large in cooperation with the fifth group. In the case the diaphragm is positioned before the third group, the fourth group is arranged away from the image plane on the side of the short focal length, and therefore, when exceeding the lower limit, the negative distortion aberration becomes large and further the astigmatism becomes large in the entire zoom region, resulting in a difficulty of correction of the aberration. When exceeding the upper limit, the magnification effect decreases and the backfocus becomes great more than as needed and the overall length of the lens is extended.

The condition (4) is provided to strengthen the function of the fifth group which is stationary and having a positive focal length to render possible the realization of a high magnification ratio including a wide angle. When the focal length of said group of lenses becomes small, the effect given on the shape of the cam curve is similar to that of the case where the negative focal length of the first group is small. That is, the mount of movement of the first group required when zooming takes place is small and the slope of the cam of the first group on the side of the short focal length becomes gentle. Thus, in order to obtain the effect as described, the refractive force of the first group need not be strengthened, and the negative focal length may be obtained largely. It is therefore possible to relieve a burden of the succeeding groups after the first group to realize a zoom lens which is small in size and has a high performance. The upper limit is a limit which does not loose said effect. However, when the focal length of the fifth group is excessively small, a negative distortion aberration occurs over the entire zooming region, which aberration becomes great especially at the end of the short focal length in which an angle of field is wide, and as a consequence, the correction becomes difficult to make.

The condition (5) is provided to realize a high zoom ratio without widening the spacing between the third and fourth groups at the end of the short focal length. If exceeding the lower limit, the magnification effect of the fourth group decreases, a burden of which is imposed on the movement of the second group, resulting in a decrease in zoom ratio. If exceeding the upper limit, even though the required zoom ratio can be realized, the spacing between the third and fourth groups becomes large at the end of the short focal length, and for the aforementioned reasons, the astigmatism and coma aberration occur excessively greatly.

The condition (6) is required to correct in a good manner a chromatic aberration of magnification simultaneously when the chromatic aberration of a paraxial ray is removed over the entire zoom region. The expression $$\sum\limits_{1} \dfrac{1}{f_i \cdot \nu_i} = 0$$

indicates the condition of chromatic correction for a lens structure as is well known. Under the condition (6) the fourth lens group is such that the expression is less than 0 and the fifth lens group satisfies the condition such that the expression is greater than 0. In other words, in order to provide for a condition of chromatic correction for the entire system the fourth lens group which has the expression less than 0 indicates over-correction and the fifth lens group which has the condition whereby the expression is greater than 0 indicates under-correction so that in the total of the zoom lens system, the chromatic aberration is over corrected by the fourth lens group while it is under corrected by the fifth lens group so that the chromatic aberration may be corrected as a whole. If the condition is outside the condition (6), it becomes difficult to correct the magnification and chromatic aberration particularly at the side of the short focal length in which an angle of field is wide.

In the following, the embodiments of the present invention which meet all the aforementioned conditions are shown. FIGS. 2, 3, 4 and 5 show in section the position and shape of the lens in the intermediate focal length in Embodiment 1, 2, 3 and 4, respectively. In the drawings, I to V indicate the first to fifth groups, respectively. In either embodiment, the resultant focal length is 28.8 to 97 mm in 35 mm size.

In the tables, ri, di, ni and νi are usual indications.

| Embodiment 1 (see FIG. 2) | | | |
|---|---|---|---|
| $28.8 \leq F \leq 97$  $F_{No} = 4$ | | | |
| Angle of field $2W = 76.9° - 24.14°$ | | | |
| $F_1 = -45$  $F_2$ 32 30.2  $F_3 = -25$  $F_4 = 39.6$  $F_5 = 222$ | | | |
| r1 = 134.892 | d1 = 4.4 | n1 = 1.51680 | ν1 = 64.20 |
| r2 = −452.755 | d2 = 0.1 | | |
| r3 = 131.827 | d3 = 2.0 | n2 = 1.71300 | ν2 = 53.94 |
| r4 = 38.599 | d4 = 7.24 | | |
| r5 = −148.116 | d5 = 3.47 | n3 = 1.84666 | ν3 = 23.83 |
| r6 = −56.656 | d5 = 1.5 | n4 = 1.75500 | ν4 = 52.33 |
| r7 = 73.269 | d6 = variable | | |
| r8 = 86.994 | d8 = 4.43 | n5 = 1.69680 | ν5 = 55.46 |
| r9 = −41.100 | d9 = 1.1 | n6 = 1.84666 | ν6 = 23.83 |
| r10 = −136.980 | d10 = 0.1 | | |
| r11 = 138.499 | d11 = 3.22 | n7 = 1.51680 | ν7 = 64.20 |
| r12 = −68.497 | d12 = 0.1 | | |
| r13 = 27.471 | d13 = 3.8 | n8 = 1.51680 | ν8 = 64.20 |
| r14 = 74.306 | d14 = variable | | |
| r15 = 94.094 | d15 = 1.0 | n9 = 1.51680 | ν9 = 64.20 |
| r16 = 42.714 | d16 = 1.9 | | |
| 517 = −32.495 | d17 = 1.0 | n10 = 1.69680 | ν10 = 55.46 |
| r18 = 19.594 | d18 = 2.06 | n11 = 1.80518 | ν11 = 25.46 |
| r19 = 48.430 | d19 = variable | | |
| r20 = ∞ | d20 = 3.92 | n12 = 1.74400 | ν12 = 44.87 |
| r21 = −29.140 | d21 = 0.1 | | |
| r22 = 70.894 | d22 = 7.5 | n13 = 1.58913 | ν13 = 61.25 |
| r23 = −21.126 | d23 = 1.1 | n14 = 1.80518 | ν14 = 25.46 |
| r24 = ∞ | d24 = variable | | |
| 525 = 265.754 | d25 = 1.2 | n15 = 1.71300 | ν15 = 53.94 |
| r26 = 54.449 | d26 = 3.4 | n16 = 1.68893 | ν16 = 31.16 |
| r27 = −302.512 | | | |

| Variable Spacing | | | |
|---|---|---|---|
| F | 28.8 | 52.855 | 97 |
| d7 | 83.244 | 13.878 | 1.032 |
| d14 | 3.483 | 13.045 | 27.185 |
| d19 | 13.686 | 8.905 | 1.835 |
| d24 | 0.769 | 5.551 | 12.620 |

At this time, the value of the first formula of the condition (6) is −0.0003548 and the value of the second formula is 0.0002847.

| Embodiment 2 (see FIG. 3) | | | |
|---|---|---|---|
| $28.8 \leq F \leq 97$  $F_{No} = 4$ | | | |
| Angle of field $2W = 76.78° - 24.18°$ | | | |
| $F_1 = -45$  $F_2 = 30.4$  $F_3 = -24.4$  $F_4 = 39.6$ | | | |
| $F_5 = 169$ | | | |
| r1 = 149.185 | d1 = 3.7 | n1 = 1.65844 | ν1 = 50.85 |
| r2 = −791.524 | d2 = 0.1 | | |
| r3 = 111.059 | d3 = 2.0 | n2 = 1.71300 | ν2 = 53.94 |
| r4 = 35.479 | d4 = 6.6 | | |
| r5 = −278.744 | d5 = 3.5 | n3 = 1.84666 | ν3 = 23.83 |
| r6 = −62.614 | d6 = 1.7 | n4 = 1.75500 | ν4 = 52.33 |
| r7 = 63.443 | d7 = variable | | |
| r8 = 88.653 | d8 = 4.0 | n5 = 1.75500 | ν5 = 52.33 |

| -continued | | | |
|---|---|---|---|
| Embodiment 2 (see FIG. 3) | | | |
| r9 = −57.429 | d9 = 1.1 | n6 = 1.84666 | ν6 = 23.83 |
| r10 = 369.859 | d10 = 0.1 | | |
| r11 = 64.117 | d11 = 3.8 | n7 = 1.51680 | ν7 = 64.20 |
| r12 = −66.924 | d12 = 0.1 | | |
| r13 = 29.292 | d13 = 3.1 | n8 = 1.58913 | ν8 = 61.25 |
| r14 = 86.013 | d14 = variable | | |
| r15 = −7876.826 | d15 = 1.0 | n9 = 1.51680 | ν9 = 64.20 |
| r16 = 85.170 | d16 = 1.9 | | |
| r17 = −35.626 | d17 = 1.0 | n10 = 1.69680 | ν10 = 55.46 |
| r18 = 19.359 | d18 = 2.0 | n11 = 1.80518 | ν11 = 25.46 |
| r19 = 41.92 | d19 = variable | | |
| r20 = 249.057 | d20 = 3.9 | n12 = 1.74400 | ν12 = 44.87 |
| r21 = −33.688 | d21 = 0.1 | | |
| r22 = 93.889 | d22 = 8.0 | n13 = 1.58904 | ν13 = 52.93 |
| r23 = −22.526 | d23 = 1.1 | n14 = 1.80518 | ν14 = 25.46 |
| r24 = −312.252 | d24 = variable | | |
| r25 = −811.278 | d25 = 2.5 | n15 = 1.68893 | ν15 = 31.16 |
| r26 = −100.888 | | | |

| Variable Spacing | | | |
|---|---|---|---|
| F | 28.8 | 52.855 | 97 |
| d7 | 33.439 | 12.311 | 0.940 |
| d14 | 3.461 | 13.834 | 28.454 |
| d19 | 15.078 | 9.892 | 2.582 |
| d24 | 1.298 | 6.484 | 13.794 |

At this time, the value of the first formula of the condition (6) is −0.0001481 and the value of the second formula is 0.0001921.

| Embodiment 3 (see FIG. 4) | | | |
|---|---|---|---|
| $28.8 \leq F \leq 97$  $F_{No} = 3.44 - 4.52$ | | | |
| Angle of field $2W = 77.56° - 24.14°$ | | | |
| $F_1 = -45$  $F_2 = 29$  $F_3 = -24.4$  $F_4 = 39.6$ | | | |
| $F_5 = 200$ | | | |
| r1 = 111.157 | | | |
| r2 = −825.676 | d1 = 5.4 | n1 = 1.51680 | ν1 = 64.20 |
| r3 = 131.783 | d2 = 0.1 | | |
| r4 = 37.099 | d3 = 1.8 | n2 = 1.71300 | ν2 = 53.94 |
| r5 = −1292.125 | d4 = 6.2 | | |
| r6 = 25.718 | d5 = 1.2 | n3 = 1.75500 | ν3 = 52.33 |
| r7 = 51.379 | d6 = 5.7 | n4 = 1.84666 | ν4 = 23.83 |
| r8 = 48.684 | d7 = variable | | |
| r9 = −24.785 | d8 = 6.0 | n5 = 1.75500 | ν5 = 52.33 |
| r10 = −68.910 | d9 = 1.1 | n6 = 1.84666 | ν6 = 23.83 |
| r11 = 30.123 | d10 = 0.1 | | |
| r12 = 60.712 | d11 = 3.2 | n7 = 1.64000 | ν7 = 60.15 |
| r13 = 1269.782 | d12 = variable | | |
| r14 = 62.824 | d13 = 0.8 | n8 = 1.65830 | ν8 = 57.26 |
| r15 = −38.037 | d14 = 1.9 | | |
| r16 = 25.285 | d15 = 0.8 | n9 = 1.69680 | ν9 = 55.46 |
| r17 = 51.171 | d16 = 2.6 | n10 = 1.80518 | ν10 = 25.46 |
| r18 = −98.249 | d17 = variable | | |
| r19 = −28.053 | d18 = 3.0 | n11 = 1.78590 | ν11 = 43.93 |
| r20 = 43.891 | d19 = 0.1 | | |
| r21 = −24.852 | d20 = 7.8 | n12 = 1.58913 | ν12 = 61.25 |
| r22 = 488.043 | d21 = 1.1 | n13 = 1.80518 | ν13 = 25.46 |
| r23 = 186.354 | d22 = variable | | |
| r24 = 27.102 | d23 = 1.0 | n14 = 1.71300 | ν14 = 53.94 |
| r25 = −250.608 | d24 = 5.5 | n15 = 1.67270 | ν15 = 32.17 |

| Variable Spacing | | | |
|---|---|---|---|
| F | 28.8 | 52.855 | 97 |
| d7 | 37.509 | 14.397 | 2.047 |
| d12 | 2.048 | 11.281 | 24.838 |
| d17 | 13.146 | 8.529 | 1.751 |
| d22 | 0.528 | 5.145 | 11.923 |

In this embodiment, the open aperture diameter is made constant during the zooming, and therefore, the aperture ratio is as follows:

| F | 28.8 | 52.855 | 97 |
|---|---|---|---|
| $F_{No}$ | 3.44 | 3.84 | 4.52 |

At this time, the value of the first formula of the condition (6) is −0.000294 and the value of the second formula is 0.0004338.

| Embodiment 4 (see FIG. 5) | | | |
|---|---|---|---|
| $28.8 \leq F \leq 97$   $F_{No} = 4$ | | | |
| Angle of field 2W = 76.56° − 24.1° | | | |
| $F_1 = -45$   $F_2 = 30.2$   $F_3 = -25$   $F_4 = 39.6$   $F_5 = 222$ | | | |
| r1 = 167.347 | d1 = 4.5 | n1 = 1.65844 | v1 = 50.85 |
| r2 = −519.920 | d2 = 0.1 | | |
| r3 = 131.827 | d3 = 2.0 | n2 = 1.71300 | v2 = 53.94 |
| r4 = 38.000 | d4 = 7.33 | | |
| r5 = −153.440 | d5 = 1.5 | n3 = 1.75500 | v3 = 52.33 |
| r6 = 37.832 | d6 = 3.9 | n4 = 1.84666 | v4 = 23.83 |
| r7 = 75.998 | d7 = variable | | |
| r8 = 87.981 | d8 = 4.88 | n5 = 1.69680 | v5 = 55.46 |
| r9 = −34.190 | d9 = 1.1 | n6 = 1.84666 | v6 = 23.83 |
| r10 = −112.137 | d10 = 0.1 | | |
| r11 = 165.710 | d11 = 3.04 | n7 = 1.51680 | v7 = 64.20 |
| r12 = −67.114 | d12 = 0.1 | | |
| r13 = 27.957 | d13 = 4.0 | n8 = 1.51680 | v8 = 64.20 |
| r14 = 76.952 | d14 = variable | | |
| r15 = 67.435 | d15 = 1.0 | n9 = 1.51680 | v9 = 64.20 |
| r16 = 36.999 | d16 = 1.9 | | |
| r17 = −32.339 | d17 = 1.0 | n10 = 1.69680 | v10 = 55.46 |
| r18 = 17.706 | d18 = 2.2 | n11 = 1.80518 | v11 = 25.46 |
| r19 = 46.091 | d19 = variable | | |
| r20 = −639.110 | d20 = 3.92 | n12 = 1.74400 | v12 = 44.87 |
| r21 = −28.382 | d21 = 0.1 | | |
| r22 = 68.486 | d22 = 7.5 | n13 = 1.58913 | v13 = 61.25 |
| r23 = −21.141 | d23 = 1.1 | n14 = 1.80518 | v14 = 25.46 |
| r24 = −5298.500 | d24 = variable | | |
| r25 = 237.362 | d25 = 1.2 | n15 = 1.71300 | v15 = 53.94 |
| r26 = 54.862 | d26 = 3.4 | n16 = 1.68893 | v16 = 31.16 |
| r27 = −352.816 | | | |

| | Variable Spacing | | |
|---|---|---|---|
| F | 28.8 | 52.855 | 97 |
| d7 | 38.047 | 13.969 | 0.913 |
| d14 | 3.276 | 12.623 | 27.011 |
| d19 | 13.647 | 8.514 | 1.779 |
| d24 | 0.831 | 5.963 | 12.699 |

At this time, the value of the first formula of the condition (6) is −0.0003514 and the value of the second formula is 0.0002793.

FIGS. 6, 7, 8 and 9 show aberrations for Embodiments 1, 2, 3 and 4, respectively. In FIGS. 6-9, (A) is for F=28.8, (B) for F=52.855, and (C) for F=97. In the figures, reference character SA designates the spherical aberration, SC, the sine condition, ΔS, the wane-spherical focal line and ΔM, the meridian focal line.

As can be seen clearly in FIGS. 6-9, in every embodiment, the good aberration state is maintained through the variation region of the focal length.

What is claimed is:

1. A wide angle zoom lens, comprising, in order from an object side, a first group of lenses having a negative focal length, a second group of lenses having a positive focal length, a third group of lenses having a negative focal length and a fourth and fifth group of lenses each of said fourth and fifth group having a positive focal length, whereby when a zoom operation is effected from a side of a short focal length to a side of a long focal length, said first group of lenses is moved in one of a first path of movement and a second path of movement wherein said first path of movement is such that said first group of lenses is first moved toward the final image plane on an optical axis in a first phase of movement and then moved toward the object in a second phase of movement and wherein said second path of movement is such that said first group of lenses is moved only towards said final image plane with each of said paths being executed in a non-linear fashion in order to correct variation of a focal position, and wherein said second group is monotonically moved towards the object to effect magnification, said third group remains immovable, said fourth group is monotonically moved towards the object at a rate relatively slower than said second group to effect magnification, and said fifth group remains immovable.

2. The zoom lens according to claim 1, wherein the following condition is met:

$$1.4 < |F_1|/F_w < 1.8$$

$$0.9 < F_2/F_w < 1.4$$

$$1.1 < F_4/F_w < 2$$

$$4 < F_5/F_w < 20$$

$$0.3 < V_4/V_2 < 1$$

$$\sum_{j=1}^{k4} \frac{1}{f_{4j} \cdot v^{4j}} < 0$$

$$\sum_{j=1}^{k5} \frac{1}{f_{5j} \cdot v^{5j}} > 0$$

where $F_i$: focal length of the i group $F_w$: resultant focal length of the entire system at the end of the short focal length $V_i$: moving speed of zooming of the i group $f_{ij}$: ocal length of the j lens which constitutes the i group $v_{ij}$: Abbe number of the j lens which constitutes the i group $k_i$: number of lenses which constitute the i group.

* * * * *